Figure 1:
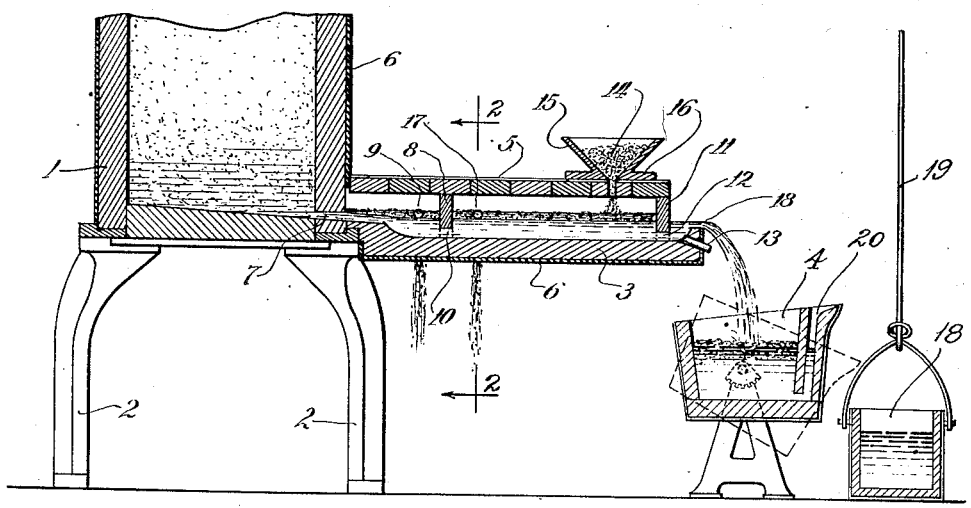

June 29, 1926.

G. S. EVANS 1,590,730

METHOD OF DESULPHURIZING IRON

Filed April 23, 1924

Inventor:-
George S. Evans
By:- Munday, Clarke & Carpenter
Attys.

Patented June 29, 1926.

1,590,730

UNITED STATES PATENT OFFICE.

GEORGE S. EVANS, OF OAK PARK, ILLINOIS, ASSIGNOR, BY MESNE ASSIGNMENTS, TO THE MATHIESON ALKALI WORKS, OF NEW YORK, N. Y., A CORPORATION OF VIRGINIA.

METHOD OF DESULPHURIZING IRON.

Application filed April 23, 1924. Serial No. 708,410.

The invention relates to a process of purifying molten cast iron, and more particularly to the process of desulphurizing molten iron by the addition of a re-agent, consisting of certain specially prepared chemicals, or chemical compounds to the mass of molten iron.

A principal object of the present invention resides in a process of desulphurizing iron which may be conveniently, economically and efficiently carried out in conjunction with the usual foundry practice, and without involving expensive or special equipment.

A further object of the invention resides in a process of desulphurizing molten iron by the addition of a specially prepared reagent, consisting of chemicals or chemical compounds directly to the molten iron as it flows from the cupola, or other melting furnace, and prior to the pouring of the same into the mixing ladle, or other receptacle.

A further object of the invention resides in the process of purifying iron which contemplates a reaction of the chemical compounds with the sulphur and sulphide content of the molten iron, as well as the occluded slag particles entrained therein, to form other sulphides, or compounds which will be absorbed by and removed with the slag resulting from the reaction.

A further object of the invention resides in the process of purifying, or desulphurizing iron which is practical in operation and non-injurious to the health and comfort of the workers and which can be adapted to the operation of the average commercial cast iron foundry at a minimum of expense and without interfering with the regular routine operation of the melting furnace or casting operations in the foundry.

Numerous other objects and advantages of the invention will be apparent as it is better understood from the following description, which, taken in connection with the accompanying drawings, discloses a preferred embodiment thereof.

In foundry practice, a large part of all car wheel foundry mixtures is made up of scrap wheels, received as part-payment in exchange for new wheels, which arrangement stabilizes the scrap value of old wheels to the mutual advantage of the railroads and wheel manufacturers alike. The sulphur content of cast iron increases with each remelting, as carried out in the ordinary foundry practice, and as the scrap wheels are continually being returned and remelted, proportionately larger percentages of new metals are required in the mixture with each remelting, in order to hold the sulphur content within the maximum limits prescribed as being essential to the satisfactory performance of the wheels in service. This addition of larger percentages of new metals, consisting mostly of pig iron, reduces the exchange or scrap value of the worn out wheels, resulting in a loss both to the railroads and wheel manufacturers.

It has long been generally recognized that sulphur, phosphorus and other so-called elemental impurities in cast iron could be removed in part from molten cast iron at the ordinary temperature as melted by addition to the ladle, or other container in which the iron is melted, of certain chemicals, or compounds, such as borax, barium, calcium and sodium salts, or the like, without super-heating the bath, as in the manufacture of steel, by the open hearth or other methods and without material injury to the casting properties of the iron; but to the best of my knowledge, all said methods of treating molten cast iron in the ladle, or other receptacle as received from the cupola or other melting furnace, for the removal of sulphur and the like, have been more or less complicated. Furthermore, these present methods have proved dangerous or injurious to the health and comfort of the workers, and expensive either for treating the material itself, or for the process involved in its manufacture and use. Also, it has been found that the methods specified for the way in which the purifying or treating material shall be used directly interferes with foundry operations to such an extent as to make the process absolutely prohibitive.

In the manufacture of specification castings, such as chilled iron railroad car wheels in particular, and other chilled and miscellaneous gray iron castings subjected to severe service conditions, close control over the so-called impurities, such as sulphur, silicon, manganese, carbon and other elements contained in cast iron, is essential to the proper regulation of the physical properties of the finished casting. It is also equally essential that more or less even temperature conditions be maintained in the bath of molten iron to insure correct pouring temperature. It is also essential that the regular routine supply of molten iron for pouring is not interrupted by the process. These requirements, all of which are essential to the proper operation of the average commercial foundry and to the manufacture of chilled iron railroad car wheels in particular, are specifically contemplated by the present invention, as hereinafter described. In known processes for refining molten iron by additions of alkalies and the like to the bath for removal of sulphur, some one or more of the other elements are also affected to a more or less degree, dependent upon the nature of the material used, quantity added, composition and temperature of the molten iron, together with the time the reaction is allowed to go on and the method of removal of the products of the reaction. The reaction, however, and its effect both upon the sulphur content and other so-called elemental impurities, is more or less constant under uniform conditions and can be compensated for by changes in the composition of the cupola charge or by ladle additions, so as to maintain the correct balance between the different elements in the treated or processed metal to effect the desired physical properties in the finished casting. This is contemplated and provided for in the present invention by more or less continuous additions of the treatment compound to the bath and a like removal of a portion of the resultant slag, as required to maintain a more or less uniformly concentrated bath, the effects of which have been predetermined and compensated for in the cupola charge, or by ladle additions of ferro alloys added with the re-agent. The improved process, as hereinafter described, furthermore tends to produce more or less constant temperature conditions and a minimum of delay in the delivery of molten iron for pouring.

With such objects in view, as well as other objects which are incident to the use of the improvements, the invention consists in the parts and combinations hereinafter set forth and claimed.

In order to make the invention more clearly understood, there are shown in the accompanying drawings means for carrying the same into practical effect, without limiting the improvements, in their useful applications, to the particular method and apparatus, which, for the purpose of explanation, has been made the subject of illustration.

Figure 2:
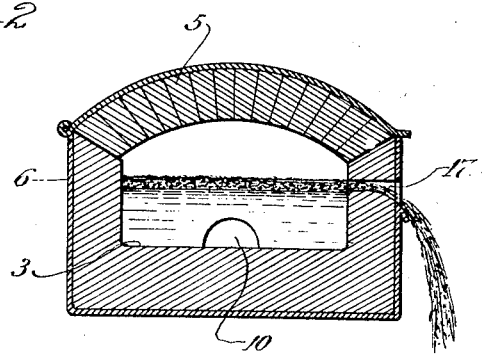

In said drawings,

Figure 1 is a vertical sectional view through a portion of a cupola, or other type of melting furnace, and illustrating the use of the present invention in one of its preferred embodiments; and Fig. 2 is an enlarged transverse sectional view on line 2—2 of Fig. 1.

Referring to the drawings, 1 indicates a cupola or usual type of melting furnace of refractory material, suitably supported by standards or legs 2. The improved process of purifying and desulphurizing the molten iron received from the cupola is carried out by means of the structure illustrated at the right hand of Fig. 1, and which consists in a special elongated fore-hearth, or reservoir 3, which is built into the cupola and interposed between the latter and the mixing and tilting ladle, or other receptacle 4 provided for the reception of the purified metal. The reservoir 3 is, or may be provided with an arched removable cover, or roof 5, and the refractory material of which the reservoir and cupola are constructed are of preference provided with a suitable protective lining, or outer casing 6. An aperture or passage 7 is provided at the base of the cupola 1, which communicates with the reservoir 3 to permit the molten iron to flow from the cupola into the reservoir, or hearth 3 where it is treated. The hearth 3 is provided with a suitably disposed skim gate 8 at or near one end thereof, which is adapted to separate the cupola slag from the iron before it enters the hearth, which slag is adapted to escape or discharge between the skim gate 8 and the cupola by means of the aperture or discharge opening 9. The relatively purer molten iron beneath the slag surface flows into the main body portion of the hearth 3 through the opening or aperture 10 in the skim gate 8. A second skim gate 11, similar to the gate 8, is disposed preferably at the end of the hearth to retain the slag and other impurities within the hearth, and is similarly apertured, as at 12, to permit the purified iron to flow over the end of the hearth into the receiving mixing ladle 4. A drain pipe 13 is arranged in a tapping hole at the end of the hearth 3 to serve as a means for completely draining the hearth of its molten metal content into the ladle 4 at the conclusion of the cupola heat to render the hearth again ready for the succeeding heat. The skim gates 8 and 11 serve to retain the chemical re-agent within the hearth, or reservoir 3, and enable the same to completely react with the sulphur and other impurities in the iron to remove the same prior to its discharge into the ladle 4. As illustrated, this chemical re-agent, consisting preferably of fused soda ash, is admitted at one end of the hearth at a point preferably adjacent to the outer skim gate 11, and the re-agent is indicated at 14 as contained within a suitable hopper 15, communicating with an aperture 16 in the roof of the hearth, and this permits the fused soda ash, or other chemical compounds, to contact with the molten iron within the reservoir between the relatively distantly spaced gates 8 and 11. After combining and reacting with the impurities, the spent re-agent, such as fused soda ash and resultant slag impurities, flows off, or is discharged from the reservoir through the discharge opening 17 just behind the skim gate 8 and at a point where the molten iron first enters the refining reservoir. With this arrangement, it will be observed that the impure iron is first subjected to the action of the partially spent re-agent, coming into contact with an increasingly concentrated bath as it passes through the reservoir 3 until the final stage in reached, when it is subjected to the action of the pure re-agent in the vicinity directly beneath the hopper 15.

The treated molten metal is poured from the mixing ladle 4 into the receiving ladle 18, which is or may be suspended from an overhead crane, or suitable transporting device (not shown) by means of a cable 19. It will be further understood that the hopper 15 may be located in any desired point along the hearth 3, or the re-agent may be added directly to the pouring ladle 4, in which latter event the reaction will take place in said ladle and the purified metal poured off by means of the submerged spout 20.

The length of time that the iron is subjected to the fused soda ash, or other re-agent, is of great importance to the success of the ultimate result, and is governed by the relation between the melting rate of the cupola 1 and the capacity of the refining hearth, which latter may be constructed in any desired capacity to adequately accommodate the molten iron to be purified. For instance, if five minutes is required for the reaction and the melting rate of the cupola is 500 pounds per minute, the hearth would be constructed to hold 2500 pounds of metal between the skim gates 8 and 11, in which event the iron would require five minutes in passing between these points and comprising that portion of the hearth 3 covered by the re-agent. With this arrangement the physical properties of the metal, as affected by the treatment, are under immediate close control, and by increasing or decreasing the amount of the refining material, the extent of the reaction can be increased or decreased at will. This system, as will be readily apparent, results in a maximum efficiency per unit of refining re-agent.

The re-agent, as above stated, consists preferably of a mixture of common fused soda ash (commercially sodium carbonate) to which is added limestone, or dolomite and the like, in such proportions as are required to effect the maximum reduction of sulphur and entrained slag particles per unit of re-agent, with a minimum injurious effect upon the other so-called elemental impurities usually found in cast iron and upon the lining of the ladle or reservoir in which the process is carried out. It is not desired to restrict the invention to the use of this mixture alone as outlined, as soda ash, per se, or other alkaline chemicals or earths, such as potash, calcium oxide, barium, or magnesium carbonates and various mixtures and proportions of the same may be used equally well. As carried out, the re-agent is preferably made by thoroughly mixing the dry ingredients in the powdered form, after which it is fused together and cast into briquettes, or sintered into lump form, or briquetted under pressure to prevent the loss of material, as dust, and to further prevent any injurious effect upon the health and comfort of the workers during the carrying out of the process.

Preferably the fused soda ash, or other re-agent which might vary from a minimum of one pound to a maximum of 100 pounds per ton, is added to the molten iron as it runs from the cupola by means of the chute 15, although other methods might be used with equal success, or the re-agent might be added directly to the receiving tilting and mixing ladle 4. Immediately following the addition of the re-agent, which is added with each tap of the cupola, or continuously if the molten metal is continually pouring from the cupola, violent reaction sets in, which causes the iron to boil and all parts of the mass are exposed to the action of the re-agent, which latter absorbs a portion of the sulphur and entrained slag particles and retains them in the slag. A portion of the slag is drawn off at regular intervals through the aperture 17, as required to maintain the proper concentration of the re-agent in the slag bath so as to effect the desired reaction. The purified metal is drawn off, as described, at one end 18 of the chute 3 into the mixing and tilting ladle 4, as shown.

The process, as above described, has been successfully used in making several thousand chilled iron wheels wherein the sulphur content of the molten iron has been reduced from approximately .18% to .125% in the finished wheel; and this reduction has been carried out at a minimum cost per ton of metal so treated, with a proportionate increase in manganese recovery from the slag, thereby necessitating the use of less ferro-manganese after the treatment of the metal.

The specifications of chilled car wheels usually call for three times as much manganese as sulphur in the finished casting. In other words, if the sulphur content is .20, the manganese content must be .60. In ordinary practice, it is usually necessary to add a quantity of ferro-manganese to the charge to produce a resulting mixture of about these ratios. Therefore, with the increase in the amount of sulphur removed, resulting from the present invention, there is a proportionate decrease in the amount of manganese necessary to comply with these specifications, and in carrying out the invention, an appreciable amount of the manganese required is recovered directly from the entrained slag impurities present in the molten metal, due to the chemical reaction resulting from the contact of the reagent with the iron. Furthermore, experience has demonstated that the sulphur content may be so reduced by the present invention as to permit the percentage of manganese present in the pig iron to be sufficient to satisfy the ratio of the specification.

Manganese occurs in molten iron, in part at least, in combination with sulphur as manganese sulphide and manganese oxides. Where the iron is not treated in accordance with this invention, a portion of these compounds are removed in the slag. Where the invention is employed, the sulphides and oxides are broken down, the sulphur passing off and the manganese returning to the iron to contribute to the satisfaction of the requirements of the manganese percentage. In other words, iron treated in accordance with my invention has actually a higher percentage of manganese independently of the sulphur content than would normally be provided in the same iron untreated. Particularly is this true in high sulphur irons.

The present invention produces a more improved metal in that various other chemical compounds of entrained slag impurities are removed, and a denser and more homogeneous casting is the result. The present invention further prevents segregation of the impurities in the slag by removing the same before the metal is poured.

It is thought that the invention and many of its attendant advantages will be understood from the foregoing description, and it will be apparent that various changes may be made in the present process without departing from the spirit and scope of the invention, or sacrificing all of its material advantages, the form hereinbefore described being merely a preferred embodiment thereof.

I claim:

1. The process of desulphurizing iron which consists in melting said iron, passing the molten iron through an elongated hearth in contact with a fused soda ash reagent, and retarding the passage of said molten iron through said hearth while in contact with said reagent.

2. The process of desulphurizing iron which consists in melting said iron in a cupola, passing the molten iron from said cupola through an elongated hearth in contact with a soda ash reagent, and simultaneously discharging the slag and impure ingredients of said molten iron before and after its contact with said reagent.

3. The process of desulphurizing iron which consists in melting said iron, passing the molten iron through a hearth, treating said molten iron with a soda ash reagent, retarding the passage of said molten iron through said hearth during its reaction with said fused soda ash, and discharging the slag and impure ingredients of said molten iron after its contact with said reagent.

4. The process of desulphurizing iron which consists in melting said iron in a cupola, periodically passing the molten iron from said cupola through an elongated hearth, treating said molten iron in said hearth with a fused soda ash reagent, retarding the passage of said molten iron through said hearth during its treatment with said reagent, simultaneously and periodically discharging the slag and impure ingredients of said molten iron before and after its treatment with said reagent, and periodically discharging the purified iron from said hearth.

5. The process of desulphurizing iron which consists in first subjecting the impure iron while in a molten state to the action of a partially spent reagent, then subjecting said molten iron to the action of gradually increasing concentrations of said reagent, and finally subjecting said molten iron to the action of the pure reagent.

6. The process of desulphurizing iron which consists in first subjecting the impure iron while in a molten state to the action of a soda ash reagent, then subjecting said molten iron to the action of gradually increasing concentrations of said soda ash reagent, and finally subjecting said molten iron to the action of a pure soda ash reagent.

7. The process of desulphurizing iron which consists in first subjecting the impure iron while in a molten state to the action of a partially spent reagent, then subjecting said molten iron to the action of gradually increasing concentrations of said reagent, and finally subjecting said molten iron to the action of the pure reagent, and retarding the passage of said molten iron during its contact with said reagent.

8. The process of desulphurizing iron which consists in passing impure molten iron through a bath in contact with a partially spent soda ash reagent, then subjecting the iron in said bath to the action of gradually increasing concentrations of said reagent, finally subjecting said iron to the action of the pure reagent, and discharging the impure slag from said bath before and after the reaction of said molten iron with said reagent.

9. The process of desulphurizing iron which consists in passing impure molten iron through a bath in contact with a partially spent fused soda ash reagent, then subjecting the iron in said bath to the action of gradually increasing concentrations of said reagent, finally subjecting said iron to the action of the pure reagent, and confining the zone of reaction of said reagent with said iron in said bath.

10. The process of desulphurizing iron which consists in passing impure molten iron through a bath in contact with a partially spent fused soda ash reagent, then subjecting the iron in said bath to the action of gradually increasing concentrations of said reagent, finally subjecting said iron to the action of the pure reagent, confining the zone of reaction of said reagent with said iron in said bath, and discharging the impure slag and sulphides from said bath before and after the reaction of said molten iron with said reagent.

11. The process of desulphurizing cast iron which consists in bringing molten cast iron into contact with a refining reagent, and periodically maintaining the period of reaction between said reagent and said iron for predetermined intervals during the continuous passage of the molten iron from the cupola to the pouring ladle.

12. The process of desulphurizing and refining cast iron and steel, which consists in passing the molten metal through a refining hearth, and subjecting the molten metal while in said hearth to the continuous action of a refining reagent, and causing the refined metal and the refining reagent containing the impure products to flow in opposite directions during the period of reaction.

13. The process of desulphurizing and refining iron and steel, which consists in passing the molten metal from a cupola through a refining hearth, subjecting said metal to a continuous bath of a refining reagent while passing through said hearth, the molten metal to be refined and the refining reagent entering at opposite ends of said hearth and passed in opposite directions therethrough.

14. The process of desulphurizing iron, which consists in first subjecting the impure iron while in a molten state to the action of a partially spent reagent, then subjecting said molten iron to the action of gradually increasing concentrations of said reagent, and finally subjecting said molten iron to the action of the pure reagent between the cupola and the mold.

15. The process of desulphurizing iron, which consists in melting said iron in a cupola, then first subjecting the impure iron while in a molten state to the action of a partially spent reagent, then subjecting said molten iron to the action of gradually increasing concentrations of said reagent, and finally subjecting said molten iron to the action of the pure reagent, said iron being subjected to the described actions of the reagent between said cupola and the receiving ladle.

GEORGE S. EVANS.